United States Patent [19]

Imada et al.

[11] 4,395,434
[45] Jul. 26, 1983

[54] METHOD FOR IMPROVING SURFACE PROPERTIES OF SHAPED ARTICLES OF SYNTHETIC RESINS

[75] Inventors: Kiyoshi Imada, Omiya; Susumu Ueno; Hirokazu Nomura, both of Ibaraki, all of Japan

[73] Assignee: Shin-Etsu Chemical Co., Ltd., Tokyo, Japan

[21] Appl. No.: 301,536

[22] Filed: Sep. 14, 1981

[30] Foreign Application Priority Data

Sep. 16, 1980 [JP] Japan .................................. 55-128093
Sep. 16, 1980 [JP] Japan .................................. 55-128094

[51] Int. Cl.$^3$ ........................... B05D 3/04; B08B 17/02
[52] U.S. Cl. ............................................ 427/38; 427/40
[58] Field of Search ...................................... 427/38, 40

[56] References Cited

U.S. PATENT DOCUMENTS 4,072,769 2/1978 Lidel ....................................... 427/38
4,261,806 4/1981 Asai et al. ........................... 427/40 X Primary Examiner—James R. Hoffman
Attorney, Agent, or Firm—Toren, McGeady and Stanger

[57] ABSTRACT

The invention provides a novel and efficient method for modifying the surface properties of a shaped article of a synthetic resin such as a polyvinyl chloride resin in which a remarkable anti-static effect is obtained on the surface so that accumulation of static electricity on the surface is greatly reduced. The inventive method comprises exposing the surface of the shaped article to a low temperature plasma generated in a gaseous atmosphere containing a nitrogen-containing organic compound such as an amine, acid amide, diamine and heterocyclic organic compound having at least one nitrogen atom in a molecule as the ring member at a pressure from 0.001 to 10 Torr. The gas or vapor of the above mentioned nitrogen-containing organic compound is preferably diluted with an inorganic gas. The effectiveness of the above described plasma treatment is further enhanced when the plasma-treated surface of the shaped article is subsequently brought into contact with a halogen, a hydrogen halide or an organic halogen compound, e.g. chlorine, hydrogen chloride, hydrogen bromide and allyl chloride, preferably, in a gaseous phase at a pressure of at least 10 Torr.

10 Claims, No Drawings

METHOD FOR IMPROVING SURFACE PROPERTIES OF SHAPED ARTICLES OF SYNTHETIC RESINS

BACKGROUND OF THE INVENTION

The present invention relates to a method for improving surface properties of a shaped article made of a thermoplastic or thermosetting synthetic resin such as a vinyl chloride-based resin or, more particularly, to a method for reducing electrostatic charging or accumulation of static electricity on the surface of a shaped article of a synthetic resin.

As is well known, shaped articles of a synthetic resin in general or, in particular, a vinyl chloride-based resin (hereinafter referred to as PVC resin) are remarkably susceptible to the accumulation of static electricity on the surface thereof bringing about several problems of not only dirtiness of the appearance caused by the deposition or clogging of dusts on the surface but also the unpleasant influence to the human body in contact therewith by the electric shock with the static electricity accumulated on the surface and the danger of spark discharge.

Various attempts have been made to find an effective way or method for overcoming the above mentioned disadvantages of shaped articles of a synthetic resin by the improvement of the surface properties leading to the decrease of the electrostatic charge on the surface.

For example, such an anti-static effect is obtained by coating the surface of the article with a surface active agent known to be effective as an anti-static agent. This method is advantageous when the anti-static effect is to be exhibited instantly but is defective in the relatively poor durability of the effect as well as in the sticky touch of the coated surface which eventually leads to blocking of the shaped articles with each other.

Another way to reduce the electrostatic charge on the surface of a shaped article of a synthetic resin is to admix the resin with an anti-static agent, e.g. surface active agent, before the resin is shaped into the shaped article by molding. This method is satisfactory in the durability of the anti-static effect but the effectiveness of the method is impractically low when the amount of the anti-static agent is limited. When the amount of the antistatic agent incorporated into the resin is increased to such an extent that a practically significant anti-static effect is obtained, there may also be caused problems of sticky touch on the surface leading to blocking and readiness to stain in addition to coloring of the surface as well as the detrimental effect on the heat resistance of the shaped article if not to mention the adverse effect on the workability of the resin per se admixed with the anti-static agent in such a large amount.

On the other hand, there has been recently proposed a method in which the surface of a shaped article of a synthetic resin can be rendered more hydrophilic when the surface is subjected to exposure to a low temperature plasma of certain kinds of inorganic or organic gases whereby the accumulation of static electricity on the surface can be reduced to some extent. This method is, however, not satisfactory due to the relatively low effectiveness and the poor durability of the effect not to warrant the practical application of the method.

SUMMARY OF THE INVENTION

Thus, an object of the present invention is to provide a novel and improved method for reducing electrostatic charge on the surface of a shaped article made of a synthetic resin or, in particular, a PVC resin, so effective and durable that the above mentioned shortcomings in the prior art methods can be overcome by a very simple means.

The method of the present invention established as a result of the extensive investigations undertaken by the inventors for improving the surface properties of a shaped article made of a synthetic resin comprises treating the surface of the shaped article by the exposure to a low temperature plasma generated in the atmosphere of a gas or vapor of a nitrogen-containing organic compound selected from the class consisting of organic amine compounds represented by the general formula $R^1-NR_2^2$, in which $R^1$ is a monovalent hydrocarbon group and $R^2$ is a hydrogen atom or a monovalent hydrocarbon group, organic acid amides represented by the general formula $R^3-CO-NR_2^4$, in which $R^3$ is a monovalent hydrocarbon group and $R^4$ is a hydrogen atom or a monovalent hydrocarbon group, organic diamine compounds represented by the general formula $R_2^5N-R^6-NR_2^7$, in which $R^5$ and $R^7$ are each a hydrogen atom or a monovalent hydrocarbon group and $R^6$ is a divalent hydrocarbon group and heterocyclic compounds having at least one nitrogen atom in a molecule as the ring member, the pressure of the nitrogen-containing organic compound in the plasma atmosphere being in the range from 0.001 Torr to 10 Torr.

Better results are obtained when the above mentioned nitrogen-containing organic compound in the plasma atmosphere is diluted with an inorganic gas at a partial pressure of from 0.0001 to 10 Torr.

Further improvement is obtained when the shaped article of the synthetic resin having been treated with the low temperature plasma is contacted with a halogen, hydrogen halide or organic halogen compound.

DETAILED DESCRIPTION OF THE PREFERRED EMBODIMENTS

When the synthetic resin, of which the objective article in the inventive method is shaped, is a PVC resin, the resin can be either a homopolymeric resin of vinyl chloride or a copolymeric resin mainly, for example, 50% by weight or more, composed of vinyl chloride. The comonomers copolymerizable with vinyl chloride are well known in the art as exemplified by vinyl esters such as vinyl acetate, acrylic and methacrylic acids as well as esters thereof, acrylonitrile, vinylidene halides, olefins such as ethylene and propylene and the like. It is of course that not only binary copolymers but also ternary or multi-component copolymers are applicable to the method of the present invention. Graft copolymers based on a PVC resin can also be used.

These PVC resins may be used as a polymer blend of two kinds or more according to need and, in some cases, may be used as blended with other kinds of synthetic resins such as copolymers of ethylene and vinyl acetate, copolymers of styrene and acrylonitrile, copolymers of acrylonitrile and butadiene, copolymers of methyl methacrylate, styrene and butadiene, copolymers of acrylonitrile, styrene and butadiene, caprolactam resins, epoxy-modified polybutadienes, epoxy-modified polyols, organopolysiloxanes and the like.

The shaped article of the above described PVC resin may be either of a flexible type or of a rigid type according to the presence of absence of a substantial amount of a plasticizer in the formulation of the resin composition to be fabricated. Various kinds of conventional plasticizers can be used when a flexible shaped article of a plasticized PVC resin is to be subjected to the treatment according to the inventive method without particular limitations. The resin composition also can contain various kinds of other conventional additives used in the fabrication of PVC resins such as stabilizers, heat-resistance, improvers, lubricants, fillers, coloring agents, e.g. pigments and dyes, ultraviolet absorbers, anti-oxidants, crosslinking agents, surface active agents and the like without particular limitations.

The method of the present invention is of course applicable not only to the above described PVC resins but also a variety of thermoplastic and thermosetting resins exemplified by low- and high-density polyethylene, polypropylenes, polystyrenes, copolymers of acrylonitrile and styrene, saturated and unsaturated polyester resins, polycarbonate resins, polyamide resins, polyacetate resins, acrylic and methacrylic resins, polyvinyl alcohols, copolymers of acrylonitrile, styrene and butadiene, polyimide resins, polysulfone resins, polyurethane resins, copolymers of ethylene and vinyl acetate, polyamideimide resins, urea resins, melamine resins, silicone resins, polyphenylene oxide resins, polyacetal resins, poly-p-xylene resins, epoxy resins, polydiallyl phthalate resins and the like.

The method for the fabrication of the resins or resin compositions into shaped articles is also not limitative including extrusion molding, injection molding, calendering, compression molding and the like according to the kind of the resin and the desired forms of the shaped articles.

In the method of the present invention, the shaped article of a synthetic resin is first subjected to the treatment with or exposed to a low temperature plasma generated in a specific gaseous atmosphere as described below. The low temperature plasma is well known in the art as a gaseous atmosphere full of electrically charged or excited species generated by the application of an electric power through a gaseous atmosphere of a reduced pressure of from 0.001 to 10 Torr or, preferably, from 0.01 to 1 Torr. The electric power is usually supplied at a frequency of so-called high frequency ranging from several kHz to microwave region but it is desirable in the present invention that the frequency is at least 10 kHz.

The shapes and arrangement of the electrodes across which the high frequency electric voltage is applied for the plasma generation are not limitative in so far as stable plasma discharge can be obtained within the space in which the surface of the shaped article is exposed to the plasma atmosphere. Thus, a pair of inside electrodes, a pair of exterior electrodes and a coiled electrode may be used according to particular types of the apparatus for plasma generation. In particular, best results are obtained with inside electrodes, i.e. electrodes installed within the space of reduced pressure in which the shaped article of the synthetic resin is placed. The electrodes may be connected to the high frequency generator either by capacitive coupling or by inductive coupling.

The time for the plasma treatment is usually from a few seconds to several tens of minutes although the time should be determined depending on the intensity of the plasma and the desired effects on the surface of the shaped article. At any rate, denaturation of the surface of the shaped article by the heat of electric discharge should be avoided.

In the inventive method, the gaseous composition which constitutes the plasma atmosphere is of utmost importance. It has been unexpectedly discovered that best results are obtained when the low temperature plasma to which the surface of the shaped article is exposed is generated in an atmosphere of a specific nitrogen-containing organic compound at a pressure in the range from 0.001 to 10 Torr or, preferably, from 0.01 Torr to 5 Torr. Therefore, the nitrogen-containing organic compound must have a vapor pressure sufficiently high to give the above defined pressure in the plasma atmosphere.

The nitrogen-containing organic compound constituting the gaseous atmosphere is selected from the four classes of the compounds as mentioned before, i.e. amine compounds, acid amide compounds, diamine compounds and heterocyclic compounds having at least one nitrogen atom in a molecule as the ring member.

Several of the examples of these compounds are: methylamine, dimethylamine, trimethylamine, ethylamine, diethylamine, triethylamine, n-propylamine, di-n-propylamine, tri-n-propylamine, n-butylamine, n-amylamine, n-hexylamine, laurylamine, ethylenediamine, trimethylenediamine, hexamethylenediamine, ethanolamine, diethanolamine, allylamine, aniline, N-methylaniline, allyl dimethylamine, 2-aminodiethylether, 1-dimethylamino-2-chloroethane, cyclopropylamine, cyclohexylamine, ethyleneimine, 1-methylethyleneimine, formamide, N,N-dimethylformamide, capronamide, aminoacetal, benzylamine, piperidine, pyrrolidine, morpholine, pyridine, pyrrole and the like. As is understood from the above given examples, the hydrocarbon groups bonded to the nitrogen atoms may be substituted with certain substituent atoms and groups such as halogen atoms, hydroxy group, alkoxy groups and the like.

When the nitrogen-containing organic compound named above has a relatively low vapor pressure at room temperature, it is necessary that the compound is vaporized with heating and the vapor is introduced into the plasma chamber. These nitrogen-containing organic compounds may be used either alone or as a combination of two kinds or more.

It has been unexpectedly discovered that better results are obtained when the nitrogen-containing organic compound in gaseous phase is used as diluted with an inorganic gas than in the case of the use of the nitrogen-containing organic compound alone. Such inorganic gases are exemplified by helium, argon, neon, nitrogen, nitrous oxide, nitric oxide, nitrogen dioxide, oxygen, air, carbon monoxide, carbon dioxide, hydrogen, bromine cyanide, sulfur dioxide, hydrogen sulfide and the like. The partial pressure of these inorganic diluent gases in the plasma atmosphere is preferably one tenth or lower of the partial pressure of the nitrogen-containing organic compound or 0.5 Torr or lower.

It has been further discovered that best results are obtained when the surface of the shaped article of the plastic resin is subjected to the treatment by contacting with a halogen or a halogen compound (hereinafter this treatment is called halogen treatment). The halogen above mentioned includes fluorine, chlorine, bromine and iodine and the halogen compound includes hydrogen halides such as hydrogen fluoride, hydrogen chloride, hydrogen bromide and hydrogen iodide and halogen-containing organic compounds such a n-propyl fluoride, methyl chloride, methyl bromide, allyl chloride, vinyl chloride, vinyl bromide, isopropenyl chloride, 1,1,2-trifluoroethane, 1,1-dichloroethane, chloroform, carbon tetrachloride and the like.

It is optional that the halogen treatment is conducted either in a gaseous or vapor phase or in a liquid phase. When the halogen treatment is desired to be carried out in the gaseous phase and the halogen or halogen compound is liquid or solid at room temperature as is the case with bromine, iodine, allyl chloride, chloroform, carbon tetrachloride and the like, the halogen or halogen compound is vaporized by heating and/or reduction of the pressure and the vapor is introduced into the vessel for the halogen treatment. When the halogen treatment is desired to be carried out in the liquid phase and the halogen or halogen compound, such as fluorine, hydrogen fluoride, chlorine, hydrogen chloride, hydrogen bromide, hydrogen iodide, methyl chloride, vinyl chloride and the like, is gaseous under ordinary conditions, on the other hand, the plasma-treated plastic resin article is brought into contact with the halogen or halogen compound liquefied by cooling and/or compression.

The halogen treatment above mentioned is preferable carried out in a gaseous phase when simplicity of the contacting operation or unnecessary removal of the excess of the halogen or halogen compound after contacting is desired. In this case of the halogen treatment in a gaseous phase, the gaseous pressure of the halogen or halogen compound is preferably at least 10 Torr when a sufficient efficiency is desired in the halogen treatment. Sufficient improvement in the surface properties of the shaped articles of the resin is obtained usually by the halogen treatment for a time of from several tens of seconds to several tends of minutes although the optimum time largely depends on the pressure of the gaseous halogen or halogen compound, temperature of the gas, temperature of the surface of the shaped article and the like parameters.

The shaped articles of a synthetic resin treated according to the inventive method are imparted with remarkably improved surface properties with no adverse effects on the properties inherent to the resin shaped articles such as the mechanical strengths and the like. In addition to the primary objects of the improved anti-static effect and the resistance against stain on the surface as mentioned before, the treated surface is excellent in anti-abrasion resistance, receptivity of adhesives, heat resistance, wettability, printability and the like properties.

Following are the examples to illustrate the method of the present invention in further detail. In the examples below, the resin samples other than PVC resins in the form of a film, sheet or plate were commercially available products used as purchased while six kinds of PVC resin sheets A to F, each having a thickness of 0.2 to 1.0 mm, were prepared by the inventors according to the following formulations and procedures. In the formulations of the PVC resin compositions given below, the amounts of the individual ingredients taken in parts by weight are merely shown by parts.

PVC resin sheet A: a resin compound composed of 100 parts of a homopolymeric PVC resin, 5 parts of dioctyl phthalate, 2 parts of a stabilizer containing barium and zinc and 3 parts of an epoxidated soybean oil was kneaded for 10 minutes in a roller mill at 170° C. and shaped into a sheet of 0.3 mm thickness by compression molding at 175° C.

PVC resin sheet B: a resin compound composed of 100 parts of a homopolymeric PVC resin, 3 parts of dimethyltin mercaptide, 1 part of an epoxidated soybean oil and 0.5 part of ethylene bisstearylamide was kneaded for 10 minutes in a roller mill at 175° C. and shaped into a sheet of 0.2 m thickness by compression molding at 180° C.

PVC resin sheet C: a resin compound of 100 parts of a copolymeric resin of vinyl chloride and vinyl acetate (SC400G, a product by Shin-Etsu Chemical Co., Japan), 2.5 parts of dibutyltin mercaptide, 0.5 part of disbutyline maleate, 0.3 part of calcium stearate and 0.1 part of polyethylene wax was kneaded for 10 minutes in a roller mill at 175° C. and shaped into a sheet of 0.5 mm thickness by compression molding at 180° C.

PVC resin sheet D: a resin compound composed of 100 parts of a homopolymeric PVC resin, 10 parts of dioctyl phthalate, 1 part of dibutyltin mercaptide, 0.3 part of calcium stearate, 0.3 part of zinc stearate and 1 part of an epoxidated soybean oil was kneaded for 10 minutes in a roller mill at 170° C. and shaped into a sheet of 0.5 mm thickness by compression molding at 175° C.

PVC resin sheet E: a resin compound composed of 100 parts of a homopolymeric PVC resin, 2.5 parts of lead stearate, 0.5 part of tribasic lead sulfate, 0.5 part of barium stearate and 0.3 part of polyethylene wax was kneaded for 10 minutes in a roller mill at 180° C. and shaped into a sheet of 1 mm thickness by compression molding at 185° C.

PVC resin sheet F: a resin compound composed of 100 parts of the same copolymeric PVC resin as used for the resin sheet C, 3 parts of dibutyltin mercaptide, 2 parts of an epoxidated soybean oil and 0.5 part of calcium stearate was kneaded for 10 minutes in a roller mill at 180° C. and shaped into a sheet of 1 mm thickness by compression molding at 185° C.

The anti-static effect with which the resin sheet treated according to the inventive method was imparted was evaluated in the following three ways of the distance of cigarette ash attraction, the surface resistivity and the static voltage induced by rubbing. The conditions for the first and the third measurements were as follows. Distance of cigarette ash attraction: the surface of the resin sheet rubbed 10 times with a dry cotton cloth was brought toward a pile of cigarette ash and the largest distance at which the ash was first attracted by the charged surface was recorded in cm in an atmosphere of 60% relative humidity at 25° C.

Static charge voltage by rubbing: the measurements were made by use of a rotary static tester operated at 750 r.p.m. in which the surface of the plastic resin sheet was rubbed with a cotton cloth for 30 seconds under a load of 200 g.

EXAMPLES 1 and 2.

The PVC resin sheet A was placed between two plate electrodes, one of which was grounded, in a plasma chamber which was evacuated to a pressure of 0.0001 Torr and then filled with vapor of ethylamine to a pressure of 0.0005 Torr (Example 1) or 0.1 Torr (Example 2) with continuous flow of the vapor. Low temperature plasma was generated in the plasma chamber by the application of 500 watts of high frequency electric power at 13.56 MHz across the electrodes whereby the surface of the PVC resin sheet was exposed to the plasma atmosphere for 3 minutes.

The results of the measurements undertaken with these plasma-treated resin sheets are shown in Table 1 below together with the results obtained with the same resin sheet A before plasma treatment.

EXAMPLE 3

The PVC resin sheet A was placed in the plasma chamber in the same manner as in Example 1 and the chamber was evacuated to a pressure of 0.0001 Torr and then filled with vapor of pyridine to give a pressure of 0.2 Torr with continuous flow of the vapor. Low temperature plasma was generated in the chamber by the application of 800 watts of high frequency electric power at 13.56 MHz whereby the surface of the resin sheet was exposed to the plasma atmosphere for 3 minutes.

The results of the measurements undertaken with this plamsa-treated resin sheet are shown in Table 1.

below together with the results obtained with the same resin sheet before plasma treatment.

EXAMPLE 5

The PVC resin sheet B was placed in the plasma chamber in the same manner as in Example 1 and the chamber was evacuated to a pressure of 0.05 Torr and then filled with vapor of trimethylamine at a pressure of 0.5 Torr. Low temperature plasma was generated in the plasma chamber by the application of 800 watts of high frequency electric power at 110 KHz whereby the surface of the resin sheet was exposed to the plasma atmosphere for 5 minutes.

The results of the measurements undertaken with this plasma-treated resin sheet are shown in Table 2.

TABLE 1

| | | PVC resin sheet A | | | | PVC resin sheet C | | | |
|---|---|---|---|---|---|---|---|---|---|
| Example No. | | Not treated | 1 | 2 | 3 | Not treated | 12 | 13 | 14 |
| Diluent gas | Gas | — | — | — | — | — | Air | Air | Carbon dioxide |
| | Pressure, Torr | — | — | — | — | — | 0.1 | 0.7 | 0.01 |
| Organic nitrogen compound | Compound | — | Ethylamine | Ethylamine | Pyridine | — | Allylamine | Allylamine | n-Butylamine |
| | Pressure, Torr | — | 0.0005 | 0.1 | 0.2 | — | 1.0 | 1.0 | 0.20 |
| Plasma generation | Frequency, MHz | — | 13.56 | 13.56 | 13.56 | — | 13.56 | 13.56 | 13.56 |
| | Power, kW | — | 0.5 | 0.5 | 0.8 | — | 1 | 1 | 0.7 |
| | Time, minutes | — | 3 | 3 | 3 | — | 5 | 5 | 3 |
| Distance of cigarette ash attraction, cm | | 6 | 4 | 0 | 0 | 6 | 1 | 3 | 0 |
| Surface resistivity, ohm | | $5 \times 10^{15}$ | $8 \times 10^{13}$ | $1 \times 10^{8}$ | $1 \times 10^{9}$ | $6 \times 10^{15}$ | $8 \times 10^{10}$ | $5 \times 10^{13}$ | $2 \times 10^{10}$ |
| Charge voltage by rubbing, volts | | 6900 | 3400 | 300 | 500 | 7600 | 450 | 2900 | 500 |

TABLE 2

| | | PVC resin sheet B | | | | | | | | |
|---|---|---|---|---|---|---|---|---|---|---|
| Example No. | | Not treated | 4 | 5 | 6 | 7 | 8 | 9 | 10 | 11 |
| Diluent gas | Gas | — | — | Air | Air | Nitrogen | — | Nitrogen | Air | Air |
| | Pressure, Torr | — | — | 0.05 | 0.05 | 0.2 | — | 0.01 | 0.01 | 0.01 |
| Organic nitrogen compound | Compound | — | (a) | (b) | (b) | Methylamine | (a) | Methylamine | (c) | (c) |
| | Pressure, Torr | — | 0.5 | 0.5 | 0.5 | 1 | 0.5 | 0.20 | 0.3 | 0.3 |
| Plasma generation | Frequency, MHz | — | 13.56 | 0.11 | 0.005 | 13.56 | 13.56* | 13.56 | 0.11 | 0.11 |
| | Power, kW | — | 1 | 0.8 | 2 | 1 | 0.7 | 1 | 1 | 1 |
| | Time, minutes | — | 3 | 5 | 5 | 3 | 10 | 5 | 3 | 3 |
| Halogen treatment | Compound | — | — | — | — | — | — | — | — | $Cl_2$ |
| | Pressure, Torr | — | — | — | — | — | — | — | — | 100 |
| | Time, minutes | — | — | — | — | — | — | — | — | 10 |
| Distance of cigarette ash attraction, cm | | 6 | 0 | 0 | 3 | 1 | 3 | 0 | 0 | 0 |
| Surface resistivity, ohm | | $7 \times 10^{15}$ | $6 \times 10^{8}$ | $3 \times 10^{8}$ | $1 \times 10^{14}$ | $3 \times 10^{11}$ | $7 \times 10^{13}$ | $<10^{10}$ | $1 \times 10^{8}$ | $8 \times 10^{16}$ |
| Charge voltage by rubbing, volts | | 7400 | 500 | 350 | 2800 | 650 | 4100 | 1200 | 450 | 70 |

Organic nitrogen compound: (a) dimethylformamide; (b) trimethylamine; (c) ethylenediamine
*Exterior coil electrode, inductive coupling

EXAMPLE 4

The PVC resin sheet B was placed in the plasma chamber in the same manner as in the preceding examples and the plasma chamber was evacuated to a pressure of 0.0001 Torr and then filled with vapor of dimethylformamide at a pressure of 0.5 Torr. Low temperature plasma was generated in the plasma chamber by the application of 1 kilowatt of high frequency electric power at 13.56 MHz whereby the surface of the resin sheet was exposed to the plasma atmosphere for 3 minutes.

The results of the measurements undertaken with this plasma-treated PVC resin sheet are shown in Table 2

EXAMPLE 6

The PVC resin sheet and the conditions for the plasma treatment were the same as in the preceding example except that the high frequency electric power supply was 2 kilowatts at 5 kHz instead of 800 watts at 110 kHz.

The results of the measurements are shown in Table 2.

EXAMPLE 7

The PVC resin sheet B was placed in the plasma chamber in the same manner as in the preceding examples and the plasma chamber, filled in advance with nitrogen gas, was evacuated to a pressure of 0.2 Torr. Then methylamine gas was introduced into the chamber to give a pressure of 1 Torr and low temperature plasma was generated in the chamber by the application of 1 kilowatt of high frequency electric power at 13.56 MHz whereby the surface of the resin sheet was exposed to the plasma atmosphere for 3 minutes.

The results of the measurements undertaken with this plasma-treated resin sheet are shown in Table 2.

EXAMPLE 8

The PVC resin sheet and the experimental procedure were the same as in Example 3 except that the low temperature plasma was generated by the application of the electric power to an exterior coil electrode connected to the high frequency generator by inductive coupling. The plasma treatment of the resin sheet was carried out with the electric power supply of 700 watts at 13.56 MHz for 10 minutes.

The results of the measurements undertaken with this plasma-treated resin sheet are shown in Table 2.

EXAMPLE 9

The PVC resin sheet B was placed in the plasma chamber in the same manner as in Example 1 and the chamber was first evacuated to a pressure of 0.0001 Torr and then filled with nitrogen gas to a pressure of 0.01 Torr and methylamine gas to give a total pressure of 0.21 Torr with continuous flow of these gases. Low temperature plasma was generated in the plasma chamber by the application of 1 kilowatt of high frequency electric power at 13.56 MHz whereby the surface of the resin sheet was exposed to the plasma atmosphere for 5 minutes.

The results of the measurements undertaken with this plasma-treated resin sheet are shown in Table 2.

EXAMPLE 10

The PVC resin sheet B was placed in the plasma chamber in the same manner as in Example 1 and the chamber was evacuated to a pressure of 0.01 Torr and then filled with vapor of ethylenediamine to give a pressure of 0.3 Torr. Low temperature plasma was generated in the plasma chamber by the application of 1 kilowatt of high frequency electric power at 110 kHz whereby the surface of the resin sheet was exposed to the plasma atmosphere for 3 minutes.

The results of the measurements undertaken with this plasma-treated resin sheet are shown in Table 2.

EXAMPLE 11

The plasma-treated PVC resin sheet obtained in Example 10 was put into a separate vessel which was first evacuated to a pressure of 0.1 Torr and then filled with chlorine gas to give a pressure of 100 Torr so that the surface of the plasma-treated resin sheet was kept in contact with the chlorine gas for 10 minutes.

The results of the measurements undertaken with this plasma-treated and chlorine-treated resin sheet are shown in Table 2.

EXAMPLES 12 and 13

The PVC resin sheet C was placed in the plasma chamber in the same manner as in Example 1 and the chamber was evacuated to a residual pressure of air of 0.1 Torr (Example 12) or 0.7 Torr (Example 13) and then filled with vapor of allylamine to give a partial pressure of the amine vapor of 1.0 Torr. Low temperature plasma was generated in the plasma chamber by the application of 1 kilowatt of high frequency electric power at 13.56 MHz whereby the surface of the resin sheet was exposed to the plasma atmosphere for 5 minutes.

The results of the measurements undertaken with these plasma-treated resin sheets are shown in Table 1 together with the results obtained with the same PVC resin sheet C before treatment.

EXAMPLE 14

The PVC resin sheet C was placed in the plasma chamber in the same manner as in Example 12 and the chamber was first evacuated to a pressure of 0.0001 Torr and then filled with carbon dioxide gas to a pressure of 0.01 Torr with continuous flow of the gas. Vapor of n-butylamine was further introduced into the chamber to give a total pressure of 0.21 Torr with the partial pressure of the amine vapor of 0.20 Torr with continuous gas flow. Low temperature plasma was generated in the plasma chamber by the application of 700 watts of high frequency electric power at 13.56 MHz whereby the surface of the resin sheet was exposed to the plasma atmosphere for 3 minutes.

The results of the measurements undertaken with this plasma-treated resin sheet are shown in Table 1.

EXAMPLES 15 to 17

A commercially available low-pressure polyethylene film was used instead of the PVC resin sheets. The conditions for the plasma treatment were the same as in Example 9, in which the time for the treatment was 5, 15 or 30 minutes for Examples 15, 16 and 17, respectively.

The results of the measurements undertaken with these plasma-treated polyethylene films are shown in Table 3 below together with the results obtained with the same polyethylene film before plasma treatment.

EXAMPLE 18

The PVC resin sheet D was placed in the plasma chamber in the same manner as in Example 1 and the chamber was first evacuated to a pressure of $10^{-6}$ Torr and then filled with nitrogen gas to a pressure of 0.1 Torr with continuous flow of the gas. Ethylamine gas was further introduced into the chamber to give a total pressure of 0.3 Torr, i.e. the partial pressure of the amine gas of 0.2 Torr, with continuous flow of the gas. Low temperature plasma was generated in the plasma chamber by the application of 1 kilowatt of high frequency electric power at 13.56 MHz whereby the surface of the resin sheet was exposed to the plasma atmosphere for 3 minutes.

The results of the measurements undertaken with this plasma-treated resin sheet are shown in Table 4 together with the results obtained with the same resin sheet D before plasma treatment.

EXAMPLE 19

The PVC resin sheet D was subjected to the plasma treatment in just the same manner as in the preceding example and the plasma chamber containing the plasma-treated resin sheet was, after evacuation to a pressure of 0.001 Torr, filled with chlorine gas to give a pressure of 100 Torr. The plasma-treated resin sheet was kept in this atmosphere in contact with the chlorine gas for 5 minutes under 100 Torr.

The results of the measurements undertaken with this plasma-treated and halogen-treated resin sheet are shown in Table 4.

TABLE 3

| Example No. | | Polyethylene film | | | |
|---|---|---|---|---|---|
| | | Not treated | 15 | 16 | 17 |
| Diluent gas | Gas | — | Nitrogen | Nitrogen | Nitrogen |
| | Pressure, Torr | — | 0.01 | 0.01 | 0.01 |
| Organic nitrogen compound | Compound | — | Methylamine | Methylamine | Methylamine |
| | Pressure, Torr | — | 0.20 | 0.20 | 0.20 |
| Plasma generation | Frequency, MHz | — | 13.56 | 13.56 | 13.56 |
| | Power, kW | — | 1 | 1 | 1 |
| | Time, minutes | — | 5 | 15 | 30 |
| Distance of cigarette ash attraction, cm | | 8 | 4 | 2 | 0 |
| Surface resistivity, ohm | | $6 \times 10^{16}$ | $6 \times 10^{16}$ | $3 \times 10^{15}$ | $2 \times 10^{14}$ |
| Charge voltage by rubbing, volts | | 10000 | 10000 | 9800 | 7700 |

TABLE 4

| | | PVC resin sheet D | | | | PVC resin sheet F | | |
|---|---|---|---|---|---|---|---|---|
| Example No. | | Not treated | 18 | 19 | 20 | Not treated | 25 | 26 |
| Diluent gas | Gas | — | Nitrogen | Nitrogen | Argon | — | Air | Air |
| | Pressure, Torr | — | 0.1 | 0.1 | 0.6 | — | 0.0001 | 0.0001 |
| Organic nitrogen compound | Compound | — | Ethylamine | Ethylamine | Ethylamine | — | (d) | (d) |
| | Pressure, Torr | — | 0.2 | 0.2 | 0.6 | — | 0.1 | 0.1 |
| Plasma generation | Frequency, MHz | — | 13.56 | 13.56 | 13.56 | — | 0.11 | 0.11 |
| | Power, kW | — | 1 | 1 | 0.8 | — | 2 | 2 |
| | Time, minutes | — | 3 | 3 | 5 | — | 5 | 5 |
| Halogen treatment | Compound | — | — | $Cl_2$ | $Cl_2$ | — | HBr | HBr |
| | Pressure, Torr | — | — | 100 | 100* | — | 300 | 400 |
| | Time, minutes | — | — | 5 | 10 | — | 5 | 5 |
| Distance of cigarette ash attraction, cm | | 6 | 0 | 0 | 0 | 6 | 1 | 0 |
| Surface resistivity, ohm | | $4 \times 10^{15}$ | $9 \times 10^7$ | $9 \times 10^6$ | $9 \times 10^6$ | $7 \times 10^{15}$ | $5 \times 10^9$ | $3 \times 10^8$ |
| Charge voltage by rubbing, volts | | 7200 | 560 | 90 | 110 | 6900 | 350 | 150 |

Organic nitrogen compound: (d) n-propylamine
*1 Torr of air contained

EXAMPLE 20

The PVC resin sheet D was plasma-treated in a similar manner to Example 18. In this case, the diluent gas was argon at a partial pressure of 0.6 Torr instead of nitrogen gas at 0.1 Torr and the electric power for the plasma generation was decreased to 800 watts. The time of the plasma treatment was extended to 5 minutes.

The plasma-treated resin sheet taken out of the plasma chamber was put into a separate vessel which was evacuated to a pressure of 1 Torr and then filled with chlorine gas to give a pressure of 100 Torr. The plasma-treated resin sheet was kept for 10 minutes under this condition of contacting with chlorine.

The results of the measurements undertaken with this plasma-treated and halogen-treated resin sheet are shown in Table 4.

EXAMPLE 21

The PVC resin sheet E was placed in the plasma chamber in the same manner as in Example 1 and the chamber, after evacuation to a pressure of $10^{-6}$ Torr, was filled with carbon dioxide gas to give a pressure of 0.05 Torr with continuous flow of the gas. Vapor of allylamine was further introduced into the plasma chamber to give a total pressure of 1.00 Torr or a partial pressure of the amine vapor of 0.95 Torr with continuous flow of the vapor. Low temperature plasma was generated in the plasma chamber by the application of 1 kilowatt of high frequency electric power at 13.56 MHz whereby the surface of the resin sheet was exposed to the plasma atmosphere for 5 minutes.

Thereafter, the chamber containing the resin sheet was evacuated to a pressure of 0.001 Torr and then filled with hydrogen chloride gas to a pressure of 450 Torr and the plasmatreated resin sheet was kept in contact with the hydrogen chloride gas for 15 minutes.

The results of the measurements undertaken with this plasmatreated and halogen-treated resin sheet are shown in Table 5 below together with the results obtained with the same resin sheet E before treatment.

EXAMPLE 22.

The PVC resin sheet E was plasma-treated in the same manner as in the preceding example except that the partial pressures of the carbon dioxide as the diluent gas and the allylamine were 0.7 Torr and 1.0 Torr, respectively.

The anti-static measurements of the plasma-treated resin sheet were carried out without the halogen treatment to give the results shown in Table 5.

EXAMPLE 23.

The PVC resin sheet E was placed in the plasma chamber in the same manner as in Example 1 and the chamber, after evacuation to a pressure of $10^{-6}$ Torr, was filled with argon gas to give a pressure of 0.05 Torr and then dimethylamine gas was introduced therein to give a total pressure of 0.08 Torr or a partial pressure of the amine gas of 0.03 Torr. Low temperature plasma was generated in the plasma chamber by the application of 2 kilowatts of high frequency electric power at 110 kHz whereby the surface of the resin sheet was exposed to the plasma atmosphere for 2 minutes.

TABLE 5

| Example No. | | Not treated | 21 | 22 | 23 | 24 |
|---|---|---|---|---|---|---|
| Diluent gas | Gas | — | Carbon dioxide | Carbon dioxide | Argon | Nitrogen |
| | Pressure, Torr | — | 0.05 | 0.7 | 0.05 | 0.3 |
| Organic nitrogen compound | Compound | — | Allylamine | Allylamine | (e) | (a) |
| | Pressure, Torr | — | 0.95 | 1.0 | 0.03 | 0.1 |
| Plasma generation | Frequency, MHz | — | 13.56 | 13.56 | 0.11 | 13.56 |
| | Power, kW | — | 1 | 1 | 2 | 2 |
| | Time, minutes | — | 5 | 5 | 2 | 3 |
| Halogen treatment | Compound | — | HCl | — | $Cl_2$ | Allyl chloride |
| | Pressure, Torr | — | 450 | — | 150* | 760 |
| | Time, minutes | — | 15 | — | 5 | 10 |
| Distance of cigarette ash attraction, cm | | 6 | 0 | 1 | 0 | 0 |
| Surface resistivity, ohm | | $6 \times 10^{15}$ | $4 \times 10^7$ | $2 \times 10^9$ | $7 \times 10^6$ | $1 \times 10^7$ |
| Charge voltage by rubbing, volts | | 7100 | 80 | 640 | 60 | 100 |

Organic nitrogen compound: (a) dimethylformamide; (e) dimethylamine
*100 Torr of air contained The thus plasma-treated resin sheet taken out of the plasma chamber was put into a separate vessel which was, after evacuation to a pressure of 100 Torr, filled with chlorine gas to give a total pressure of 150 Torr. The resin sheet was kept for 5 minutes in this vessel to be in contact wih the chlorine gas.

The results of the measurements of the anti-static effect undertaken with this plasma-treated and halogen-treated resin sheet are shown in Table 5.

EXAMPLE 24.

The PVC resin sheet E was placed in the plasma chamber in the same manner as in Exaple 1 and the chamber was, after evacuation to a pressure of $10^{-6}$ Torr, filled with nitrogen gas to a pressure of 0.3 Torr with continuous flow of the gas. Then vapor of dimethylformamide was introduced thereinto to give a total pressur of 0.4 Torr or a partial pressure of dimethylformamide of 0.1 Torr. Low temperature plasma was generated by the application of 2 kilowatts of high frequency electric power at 13.56 MHz whereby the surface of the resin sheet was exposed to the plasma atmosphere for 3 minutes.

The thus plasma-treated resin sheet taken out of the plasma chamer was put into a separate vessel which was, after evacuation to a pressure of 0.1 Torr, filled with allyl chloride vapor to give a pressure of 760 Torr with heating. The resin sheet was kept for 10 minutes in this vessel to be in contact with the allyl chloride vapor.

The results of the measurements undertaken with this plasma-treated and halogen-treated resin sheet are shown in Table 5.

EXAMPLES 25 and 26.

The PVC resin sheet F was placed in the plasma chamber in the same manner as in Example 1 and the chamber was, after evacuation to a pressure of $10^{-6}$ Torr, filled with dry air to give a pressure of 0.0001 Torr wih continuous flow of the dry air. Vapor of n-propylamine was further introduced thereinto to give a pressure of 0.1 Torr with continuous flow of the vapor. Low temperature plasma was generated in the plasma chamber by the application of 2 kilowatts of high frequency electric power at 110 kHz whereby the surface of the resin sheet was exposed to the plasma atmosphere for 5 minutes.

The thus plasma-treated resin sheet taken out of the plasma chambers was put into a separate vessel which was, after evacuation to a pressure of 0.1 Torr, filled with hydrogen bromide gas to give a pressure of 300 Torr (Example 25) or 400 Torr (Example 26). The plasma-treated resin sheet was kept for 5 minutes in this vessel to be in contact with the hydrogen bromide gas.

The results of the measurements undertaken with these plasma-treated and halogen-treated resin sheets are shown in Table 4 together with the results obtained with the same PVC resin sheet F before treatment.

EXAMPLES 27 to 36.

The plasma treatment and halogen treatment (Examples 28, 30, 32, 34 and 36 only) were conducted in the same manner as in the preceding examples with films, sheets or plates of five kinds of synthetic resins. The resins used were: polyester resin, i.e. polyethylene terephthalate resin (Examples 27 and 28), fluorocarbon resin, i.e. polytetrafluoroethylene resin (Examples 29 and 30), polyimide resin, i.e. a polycondensation product of pyromellitic anhydride and 4,4'-diaminodiphenyl ether (Examples 31 and 32), polycarbonate resin (Examples 33 and 34) and EVA resin, i.e. a copolymer of ethylene and vinyl acetate (Examples 35 and 36). These resin samples were used as purchased.

Tables 6 and 7 to follow summarize the conditions for the plasma treatment and for the halogen treatment and the results of the measurements undertaken with the plasma-treated samples and the plasma-treated and then halogen-treated samples together with the results obtained with the same resin samples before the treatments.

TABLE 6

| Resin | | Polyester | | | Fluorocarbon | | | Polyimide | | |
|---|---|---|---|---|---|---|---|---|---|---|
| | Example No. | Not treated | 27 | 28 | Not treated | 29 | 30 | Not treated | 31 | 32 |
| Diluent gas | Gas | — | Air | Air | — | Air | Air | — | Argon | Argon |
| | Pressure, Torr | — | 0.05 | 0.05 | — | 0.01 | 0.01 | — | 0.07 | 0.07 |

TABLE 6-continued

| Resin | | Polyester | | | Fluorocarbon | | | Polyimide | |
|---|---|---|---|---|---|---|---|---|---|
| Example No. | | Not treated | 27 | 28 | Not treated | 29 | 30 | Not treated | 31 | 32 |
| Organic nitrogen compound | Compound | — | (e) | (e) | — | Methylamine | Methylamine | — | Allylamine | Allylamine |
| | Pressure, Torr | — | 0.15 | 0.15 | — | 0.39 | 0.39 | — | 0.63 | 0.63 |
| Plasma generation | Frequency, MHz | — | 13.56 | 13.56 | — | 13.56 | 13.56 | — | 0.11 | 0.11 |
| | Power, kW | — | 2 | 2 | — | 1 | 1 | — | 4 | 4 |
| | Time, minutes | — | 1 | 1 | — | 2 | 2 | — | 1 | 1 |
| Halogen treatment | Compound | — | — | $Cl_2$ | — | — | $Cl_2$ | — | — | $Br_2$ |
| | Pressure, Torr | — | — | 50 | — | — | 700* | — | — | 1 |
| | Time, minutes | — | — | 5 | — | — | 3 | — | — | 10 |
| Distance of cigarette ash attraction, cm | | 5 | 0 | 0 | 7 | 0 | 0 | 6 | 0 | 0 |
| Surface resistivity, ohm | | $7 \times 10^{13}$ | $1 \times 10^8$ | $4 \times 10^7$ | $6 \times 10^{15}$ | $9 \times 10^8$ | $2 \times 10^8$ | $4 \times 10^{14}$ | $7 \times 10^8$ | $1 \times 10^8$ |
| Charge voltage by rubbing, volts | | 2500 | 90 | 60 | 6800 | 190 | 110 | 1300 | 50 | 20 |

Organic nitrogen compound: (e) dimethylamine
*400 Torr of air contained

TABLE 7

| Resin | | Polycarbonate | | | EVA | | |
|---|---|---|---|---|---|---|---|
| Example No. | | Not treated | 33 | 34 | Not treated | 35 | 36 |
| Diluent gas | Gas | — | Air | Air | — | Nitrogen | Nitrogen |
| | Pressure, Torr | — | 0.01 | 0.01 | — | 0.1 | 0.1 |
| Organic nitrogen compound | Compound | — | (b) | (b) | — | (c) | (c) |
| | Pressure, Torr | — | 0.09 | 0.09 | — | 0.4 | 0.4 |
| Plasma generation | Frequency, MHz | — | 0.11 | 0.11 | — | 0.11 | 0.11 |
| | Power, kW | — | 3 | 3 | — | 3 | 3 |
| | Time, minutes | — | 1 | 1 | — | 1 | 1 |
| Halogen treatment | Compound | — | — | Allyl chloride | — | — | HCl |
| | Pressure, Torr | — | — | 20* | — | — | 700 |
| | Time, minutes | — | — | 20 | — | — | 10 |
| Distance of cigarette ash attraction, cm | | 6 | 0 | 0 | 5 | 0 | 0 |
| Surface resistivity, ohm | | $7 \times 10^{13}$ | $1 \times 10^{10}$ | $5 \times 10^9$ | $2 \times 10^{15}$ | $7 \times 10^8$ | $3 \times 10^8$ |
| Charge voltage by rubbing, volts | | 2600 | 400 | 250 | 1600 | 80 | 50 |

Organic nitrogen compound: (b) trimethylamine; (c) ethylenediamine
*10 Torr of air contained

What is claimed is:

1. A method for modifying the surface properties of a shaped article of a synthetic resin which comprises exposing the surface of the shaped article to a low temperature plasma generated in a gaseous atmosphere containing a nitrogen-containing organic compound selected from the group consisting of organic amine compounds represented by the general formula $R^1\text{-}NR^2_2$, in which $R^1$ is a monovalent hydrocarbon group and $R^2$ is a hydrogen atom or a monovalent hydrocarbon group, organic acid amide compounds represented by the general formula $R^3\text{-}CO\text{-}NR^4_2$, in which $R^3$ is a monovalent hydrocarbon group and $R^4$ is a hydrogen atom or a monovalent hydrocarbon group, organic diamine compounds represented by the general formula $R^5_2N\text{-}R^6\text{-}NR^7_2$, in which $R^5$ and $R^7$ are each a hydrogen atom or a monovalent hydrocarbon group and $R^6$ is a divalent hydrocarbon group and heterocyclic organic compounds having at least one nitrogen atom in a molecule as the ring member, at a pressure in the range from 0.001 to 10 Torr, and then contacting the compound with a halogen or a halogen-containing compound.

2. The method as claimed in claim 1 wherein the low temperature plasma is generated in the gaseous atmosphere containing the nitrogen-containing organic compound at a pressure in the range from 0.001 to 10 Torr diluted with an inorganic gas at a partial pressure in the range from 0.0001 to 10 Torr.

3. The method as claimed in claim 1 wherein the halogen-containing compound is selected from the class consisting of hydrogen halides and organic halogen compounds.

4. The method as claimed in claim 3 wherein the organic halogen compound is selected from the class consisting of n-propyl fluoride, methyl chloride, methyl bromide, allyl chloride, vinyl chloride, vinyl bromide, isopropenyl chloride, 1,1,2-trifluoroethane, 1,1-dichloroethane, chloroform and carbon tetrachloride.

5. The method as claimed in claim 1 wherein the surface of the shaped article is bought into contact with a haloen or a halogen-containing compound in a gaseous phase.

6. The method as claimed in claim 5 wherein the pressure of the halogen or halogen-containing compound in the gaseous phase is at least 10 Torr.

7. The method as claimed in claim 1 wherein the organic amine compound is selected from the class consisting of ethylamine, allylamine, n-butylamine, methylamine, trimethylamine, dimethylamine and n-propylamine.

8. The method as claimed in claim 1 wherein the organic acid amide compound is dimethylformamide.

9. The method as claimed in claim 1 wherein the organic diamine compound is ethylenediamine.

10. The method as claimed in claim 1 wherein the heterocyclic organic compound is pyridine.

* * * * *